Figure 8:
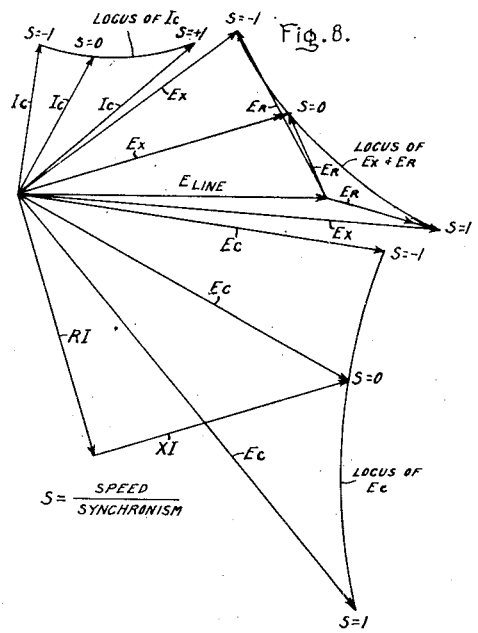

Oct. 10, 1939.                H. R. WEST                2,175,935
                            MOTOR CONTROL
                        Filed Dec. 20, 1935          3 Sheets-Sheet 1
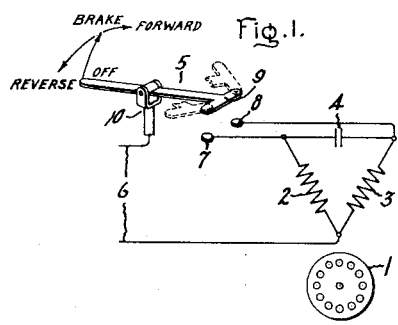
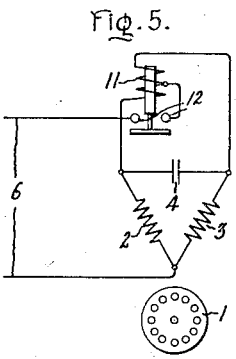
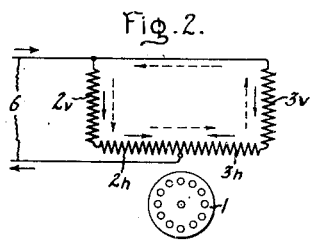
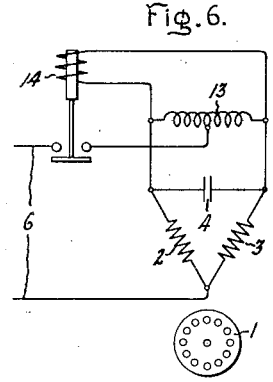
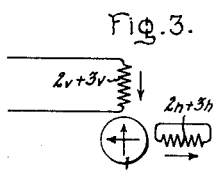
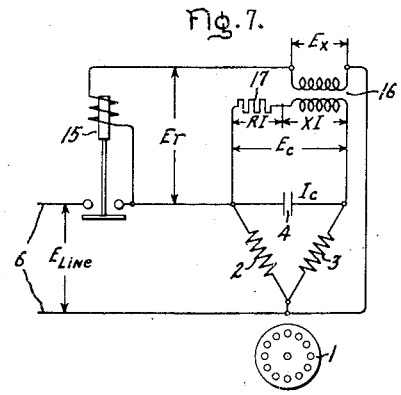
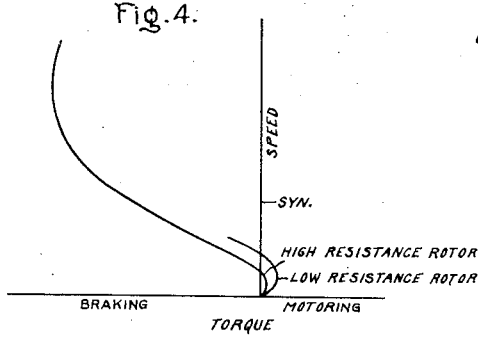
Inventor:
Harry R. West,
by Harry E. Dunham
His Attorney.

Oct. 10, 1939.  H. R. WEST  2,175,935

MOTOR CONTROL

Filed Dec. 20, 1935  3 Sheets-Sheet 3

Inventor:
Harry R. West,
by Harry E. Dunham
His Attorney.

Patented Oct. 10, 1939

2,175,935

UNITED STATES PATENT OFFICE 2,175,935

MOTOR CONTROL

Harry R. West, Pittsfield, Mass., assignor to General Electric Company, a corporation of New York Application December 20, 1935, Serial No. 55,381

37 Claims. (Cl. 172—233)

My invention relates to electric motor control systems, and more particularly to electric braking of capacitor motors.

The term electric braking is used in opposition to mechanical braking, whether or not the mechanical brake is electrically controlled. Electric braking depends upon changes in the motor connections and includes dynamic braking and plugging. The latter comprises changing the motor connections so as to reverse the torque.

In general a capacitor motor is an induction motor adapted for self-starting from a singlephase alternating current circuit by means of a capacitor (static electric condenser) which produces phase splitting. The motor may have equal or unequal windings displaced in space phase by any convenient number of electrical degrees and the capacitor may either be permanently connected in the motor circuit or it may merely be used for starting purposes and be disconnected by a suitable centrifugal device when the motor gets up to speed. However, the type of capacitor motor with which I intend particularly to practice my invention corresponds closely to a twophase induction motor in that it has substantially equal windings having their axes in electrical quadrature. The windings are V-connected with a capacitor permanently connected to close the V. Such a motor is well adapted for reversible operation and is used quite extensively to operate induction voltage regulators and tap changing mechanisms for load ratio control transformers.

In regulating apparatus of the above description it is necessary to provide braking means so that when the proper degree of regulation has been attained the apparatus can be quickly stopped so as to prevent over-running or hunting of the regulating system. Heretofore such braking has been accomplished by electro-magnetically controlled mechanical brakes. However, such brakes are relatively expensive and require considerable attention and upkeep. I am aware that electric braking both of the dynamic and plugging types is old and well known in the art but so far as I am aware this kind of braking has never been applied to capacitor motors or to any kind of motor in the manner of my invention.

In accordance with one form of my invention I secure dynamic braking of a capacitor motor by short-circuiting the capacitor while the motor is connected to the line. In another form of my invention I secure dynamic braking of a capacitor motor by applying line voltage to the motor at the electrical midpoint of an inductive winding whose terminals are connected to the terminals of the capacitor. In still another form of my invention I control the plugging connection of a capacitor motor in response to an electrical quantity associated with the capacitor motor and which varies in accordance with the speed of the motor.

However, although the various features of my invention are particularly well adapted to electric braking of capacitor motors, I wish it to be understood that they are not limited in application to such motors and that they may be applied generally to all kinds of motors and particularly to induction motors, whether polyphase or single phase and if single phase, whether resistive or reactive split phase.

An object of my invention is to provide new and improved systems of electric motor control.

Another object of my invention is to provide new and improved systems of automatically controlled electric braking of electric motors.

A further object of my invention is to provide new and improved systems of automatically braking capacitor motors with alternating current.

My invention will be better understood from the following description taken in connection with the accompanying drawings and its scope will be pointed out in the appended claims.

Figure 9:
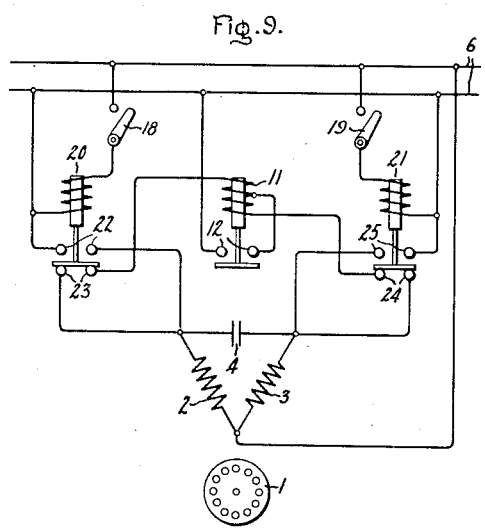
Figure 10:
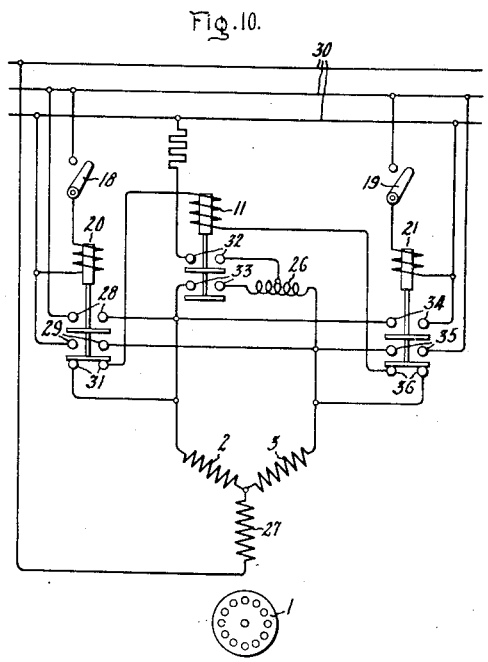
Figure 11:
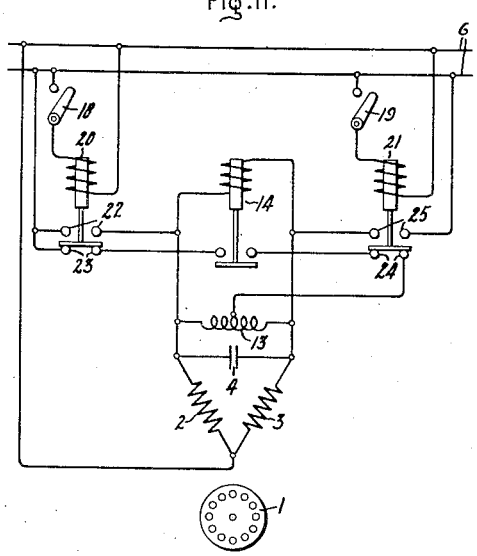
Figure 12:
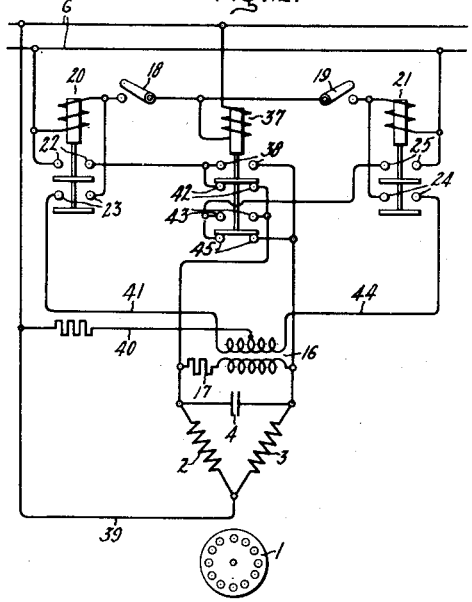
Figure 13:
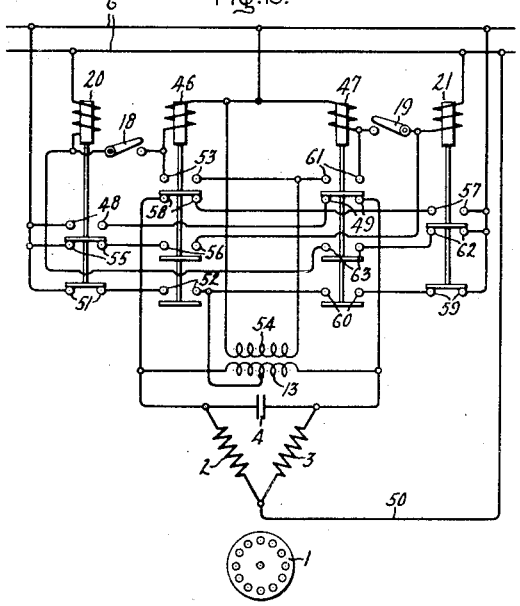
Figure 14:
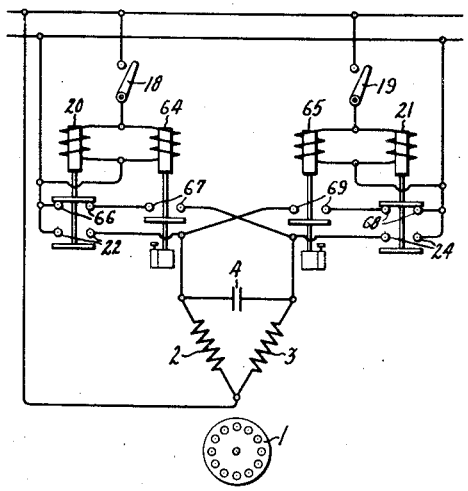
Figure 15:
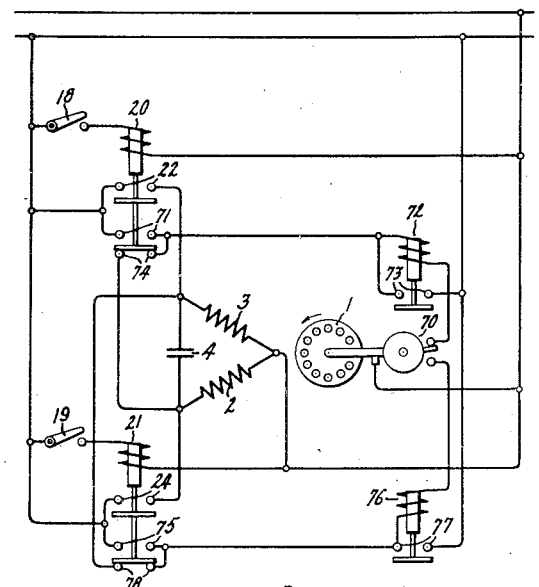

In the drawings, Fig. 1 is a diagrammatic simplified showing of a manually controlled circuit for dynamically braking a capacitor motor by short-circuiting the capacitor; Figs. 2 and 3 show successively developed equivalent circuits to the braking circuit of Fig. 1 for illustrating the principle of operation of Fig. 1; Fig. 4 illustrates the braking characteristic of the circuit of Fig. 1; Fig. 5 illustrates a simplified automatic control for the braking circuit of Fig. 1; Fig. 6 illustrates diagrammatically another simplified form of automatically controlled dynamic braking circuit for a capacitor motor; Fig. 7 is a simplified diagrammatic circuit of an automatically controlled plugging connection for a capacitor motor; Fig. 8 is a locus diagram for explaining the operation of Fig. 7; Fig. 9 is a diagrammatic showing of a reversible control system for a capacitor motor embodying the automatic dynamic braking circuit shown in Fig. 5 which is adapted for use with reversibly operated apparatus such as motor operated regulators; Fig. 10 illustrates how the circuit of Fig. 9 can be applied to a three-phase induction motor; Fig. 11 bears the same relation to Fig. 6 as Fig. 9 does to Fig. 5; Fig. 12 bears the same relation to Fig. 7 as Figs. 9 and 11 do to Figs. 5 and 6, respectively; Fig. 13 is a modification of Fig. 11 in which the dynamic braking connection is automatically followed by a momentary plugging connection; Fig. 14 illustrates a circuit for a capacitor motor in which braking is secured by establishing a plugging connection for a predetermined time, and Fig. 15 is another modification in which a motor operated drag switch controls the breaking of a plugging connection.

Referring now to the drawings, and more particularly to Fig. 1 thereof, there is shown therein a capacitor motor having a squirrel cage or short-circuited rotor 1, and a pair of stator windings 2 and 3 spaced 90 electrical degrees apart and V-connected with a capacitor 4 permanently connected across the open part of the V-connection. A manually operable switch 5 is arranged to control a connection between the motor and a single-phase alternating current supply circuit 6. Switch 5 comprises a pair of fixed contacts 7 and 8 connected respectively to the terminals of the capacitor 4 and a movable contact member 9 which is mounted on a universal joint 10. By moving the member 9 so that it engages the contact 7 the motor will be energized for forward rotation and the current in the winding 3 will lead the current in the winding 2 because the capacitor 4 is in series with the winding 3. If the movable member 9 is brought into engagement with the contact 8 instead of the contact 7 the motor will be energized for reverse rotation because then the current in the winding 2 will lead the current in the winding 3 because the capacitor 4 will then be in series with the winding 2 with respect to the supply circuit. The movable contact member 9 is long enough so that it can also be moved into a position where it bridges the contacts 7 and 8 thereby short-circuiting the capacitor 4. With such a connection I have found that there is a decided braking action and if the motor is running when this connection is made the motor will be rapidly decelerated.

While a complete theoretical explanation of this braking action is quite complicated, a relatively simple explanation is as follows: The stator phase windings 2 and 3 may be replaced by their equivalent vertical and horizontal components. For example, as shown in Fig. 2, the winding 2 is replaced by a vertical winding $2_v$ and a horizontal winding $2_h$ and the number of turns of the vertical and horizontal windings $2_v$ and $2_h$ are so proportioned that the resultant field produced by these two windings will have exactly the same magnitude and direction as that produced by the winding 2. Similarly, the winding 3 may be replaced by the components $3_v$ and $3_h$. As the condenser 4 is short-circuited it can be omitted so that Fig. 2 is equivalent to Fig. 1 when the braking connection is established by the switch member 9 bridging the contacts 7 and 8.

The line currents in Fig. 2 are indicated by the solid arrows. These are, of course, representations of the instantaneous currents and as shown they enter the motor stator windings by the upper conductor of circuit 6 and then divide and flow downward through the windings $2_v$ and $3_v$ and then inwardly to the center through the windings $2_h$ and $3_h$ and out by the lower conductor of circuit 6. As the windings 2 and 3 of Fig. 1 are substantially equal the windings $2_v$ and $3_v$ are equal and the windings $2_h$ and $3_h$ are equal. Consequently, the line currents divide equally through the windings $2_v$ and $3_v$ and due to the fact that they are flowing in opposite instantaneous directions through the windings $2_h$ and $3_h$ which are on the same core, the effects of the horizontal currents cancel each other so that there is no horizontal flux and the stator windings of Fig. 2 are the equivalent of a single vertical winding producing a single alternating vertical flux in the motor. However, if the rotor 1 of the motor is turning currents will be induced in it due to the rotation in the vertical alternating field and these currents will produce a horizontal, or the so-called quadrature, field which is present in single phase induction motors. This horizontal alternating field being in line with the winding $2_h$ and $3_h$ will induce a circulating current therein which is indicated by the dashed arrows. The instantaneous direction of this circulating current is opposite with respect to the two vertical windings $2_v$ and $3_v$ and as these windings are on the same core their inductive effects with respect to this current neutralize each other so that with respect to the circulating current it is as though the horizontal components $2_h$ and $3_h$ were short-circuited.

Consequently Fig. 2 reduces to Fig. 3 wherein the motor has a single vertical winding for producing a vertical alternating field and has a short-circuited quadrature winding. The horizontal winding tends substantially to damp out the horizontal or quadrature flux in the motor thereby substantially eliminating the rotating field which otherwise would be present if the rotor were turning. Consequently the rotor conductors in turning through the vertical stator field have currents induced therein which according to Lenz's law will be in such instantaneous directions as to produce a magnetic interaction with the vertical stator field tending to oppose the rotation. This, therefore, produces a braking action in a manner analogous to that which would be produced in an eddy current brake or in the motor of Fig. 3 if the vertical winding were energized by direct current. With direct current the rotor current would be continuous while the motor was decelerating, whereas with alternating current the rotor currents alternate with the same frequency as the vertical field and their instantaneous directions are always such as to oppose the rotation thereby producing a continuous or substantially continuous braking action.

It will be observed that the braking circuit of Fig. 1 corresponds to a two-phase induction motor whose two phase windings are connected in parallel across one of the phases of the two-phase supply circuit, because when the capacitor 4 is short-circuited the circuit is just as though the capacitor were not present. It will also be noted that substantially the same braking action can be secured by merely short-circuiting one of the phase windings of a two-phase induction motor whose other phase remains connected to one of the phases of the supply circuit. Fig. 3 may be considered as actually showing such a connection.

The characteristic of the braking action secured in Figs. 1, 2 and 3 is shown in Fig. 4. As will be seen from the curve, the speed during braking decreases relatively rapidly and the slope of the curve, that is to say the braking effect is roughly proportional to the speed. At a relatively low value of speed sufficient torque may be developed to keep the motor running. This torque and speed depend upon the resistance of the rotor, the higher the rotor resistance the lower speed and torque, while the lower the resistance of the rotor the higher the motoring speed and torque. The rotor 1 is therefore preferably a relatively high resistance rotor. However, with a reasonably high resistance rotor the motoring speed is so low that if the supply circuit is interrupted at this speed the motor will come to rest substantially immediately.

In Fig. 5 is shown one way of automatically disconnecting the motor from the supply circuit when the braking action has substantially ceased. This comprises a relay having its winding 11 connected in parallel with the capacitor 4 and having a set of contacts 12 for connecting one side of the supply circuit to the electrical midpoint of the winding 11. With such an arrangement if the rotor 1 is turning and the contacts 12 are closed the line current will tend to divide equally between the two halves of the winding 11 and will thereby energize the motor as in Fig. 1. The circulating current described in connection with Fig. 2, will flow through winding 11 thereby holding the contacts 12. The relay of Fig. 5 is preferably a relatively low impedance relay so that most of the circulating current will flow through the winding 11 rather than through the capacitor 4 thereby approximating the short-circuiting braking connection of Fig. 1. When the motor is at standstill or runnnig at very low speed insufficient circulating current will flow to hold the relay closed and consequently the circuit will be deenergized.

Another automatic arrangement is shown in Fig. 6. Here a high impedance reactor 13 and a high impedance relay 14 are connected in parallel with the capacitor 4. When the relay is energized, line voltage will be applied through the relay contacts to the electrical midpoint of the reactor. The impedance of the reactor and the relay in parallel are considerably higher than that of the capacitor. For most effective braking action, it is desirable that the impedance offered to the current circulating between the motor windings and the external impedances should be a minimum. In other words, that there should be resonance produced by the neutralization of the impedance of the motor windings by the capacitive impedance of the capacitor and the external reactor in parallel. When the motor is running at a substantial speed, the voltage across the capacitor and relay will be sufficient to keep the relay energized. At standstill or very low speed the relay armature will drop and the entire circuit will be deenergized. It is desirable that the impedance of the reactor 13 and the relay 14 should be considerably higher than that of the capacitor for two reasons. First, a certain amount of equivalent capacitance is necessary to give the desired motoring and braking action. If a low inductance reactor were used, that would be equivalent to reducing the capacitance of the capacitor. In the second place, it is desirable to have a large inductance in the reactor in order to force substantially equal division of line current between the two halves of the reactor. The reactor should be so designed that there will be but very little impedance offered to the flow of line current from the midpoint to the two terminals of the reactor.

Thus in Fig. 6 the braking action is secured by the combination of the circulating current flowing through the relatively low impedance substantially resonant circuit and the excitation of the windings 2 and 3 in parallel. When the voltage drop across the capacitor 4 decreases due to a decrease in circulating current below a predetermined value the relay 14 drops out thereby deenergizing the circuit.

In Fig. 7 there is shown an automatic circuit for maintaining a plugging connection until the motor is at rest or at very low speed. This is done by controlling the maintenance of the plugging connection in response to an electrical quantity associated with the motor and which varies in accordance with the speed of the motor. The specific quantity which is used in Fig. 7 is the voltage across the capacitor 4 and advantage is taken of the fact that the phase of this voltage varies relatively widely with changes in speed of the motor. Reversing connections are made through the contacts of a relay 15 and the winding of this relay is connected across the line in series with the secondary winding of a high reactance transformer 16 whose primary winding is connected in series with a resistance 17 across the capacitor 4. The ratio of the resistance 17 to the reactance of transformer 16 is so adjusted that a desired phase angle between the voltage drop XI across the reactance transformer and the voltage of the line is secured. The turn ratio of the transformer 16 is such that the voltage $E_x$ across the transformer is substantially equal to the voltage of the line when the motor speed is substantially zero. The voltage across the winding of relay 15, indicated by $E_r$, is then the vector difference between the voltage across the line indicated by $E_{line}$ and the voltage $E_x$ across the secondary winding of transformer 16.

The operation of Fig. 7 can best be understood by reference to the locus vector diagram in Fig. 8. The horizontal vector $E_{line}$ is the voltage of supply circuit 6. The vector $I_c$ is the current through the capacitor 4, the phase angle of which, as is well known, varies considerably with charges in speed of the motor. $I_c$ is shown for three speeds designated by $S=-1$, $S=0$, and $S=+1$ respectively, where S is the ratio of the rotor speed to the synchronous speed of the rotating stator field. As shown, $I_c$ is most leading when $S=-1$, which corresponds to the time when energization is first applied and when the speed of the motor is negative or in the opposite direction with respect to the rotating stator field. This current becomes progressively less leading as the speed passes through zero and the motor starts to operate in the motoring direction. The vector $E_c$, representing the voltage drop across the capacitor 4, also varies relatively widely in phase, corresponding to the changes in phase of the current $I_c$. The voltage drops LI and XI across the resistance 17 and the reactance transformer 16 are shown for the particular value of $E_c$ corresponding to zero speed of the motor. $E_x$ which is in phase with XI is the voltage across the secondary winding of the transformer 16 and as shown is substantially equal to the line voltage. The difference between these two voltages is the vector $E_r$ which is the voltage applied to the relay 15. At speed $S=-1$ corresponding to synchronous speed in the reverse direction, that is to say substantially to the speed when the plugging connection is first established, the difference $E_r$ between $E_x$ and $E_{line}$ is much greater. Consequently, the voltage applied to the operating winding of relay 15 can be made high enough to hold this relay closed when the plugging connection is first established and to maintain it closed until the motor speed is reduced substantially to zero. At a voltage $E_r$ corresponding to zero speed the relay 15 can be calibrated to drop out. It will be noted that $E_r$ continues to become smaller after the direction of rotation of the motor reverses so that even if the calibration is not very accurate there is no danger that the motor can continue to pick up speed in the reverse direction for the relay will be found to drop out soon after reversal if it does not drop out exactly at or just before zero speed is reached.

In Fig. 9 is shown a complete control system embodying the braking circuit of Fig. 5. This system is well adapted to control the motors for operating regulators or regulating rheostats. It comprises a set of main control contacts 18 and 19 for controlling the direction of operation of the motor. These contacts may be the raise and lower contacts of a contact making voltmeter or any other suitable electro-responsive control device or they may merely be manually operable as shown. If they are the relatively delicate contacts of an electro-responsive control device it is preferable that they control the various circuits through intermediate relays rather than directly, and consequently intermediate relays 20 and 21 are shown under the control of contacts 18 and 19, respectively.

In operation, when the contacts 18 are closed relay 20 is energized thereby completing a circuit through a set of contacts 22 on the relay 20 for operating the motor in a forward direction. When the contacts 18 are again opened the relay 20 drops out thereby closing a set of contacts 23 which completes a circuit through the relay winding 11 and a set of contacts 24 on the relay 21. The transient voltage which persists between the motor terminals for a few cycles then serves to cause the relay 11 to close its contacts 12. This, in effect, connects the windings 2 and 3 of the motor across the supply circuit 6. The braking action will then commence and will continue until the motor is substantially at rest, as has already been described in connection with Fig. 5. In a similar manner, if the contacts 19 are closed the relay 21 picks up thereby closing a set of contacts 25 which operate the motor in the reverse direction and when the contacts 19 are opened the relay 21 drops out thereby completing the circuit through the winding 11 which has already been described. It will therefore be seen that in Fig. 9 there is provided a circuit which selectively controls the operation of the motor in either direction and automatically applies dynamic braking whenever it is desired to discontinue either forward or reverse operation and this braking connection is automatically maintained until the motor comes to rest or substantially to rest, whereupon the entire circuit is automatically deenergized.

Fig. 10 shows substantially the same system as is shown in Fig. 9 applied to the control of a three-phase induction motor. There is one other difference and that is that instead of bringing the line connection for braking in at the middle point of the winding 11 of the relay it is brought in at the electrical midpoint of an auxiliary reactor 26. The third phase winding of the motor is shown at 27.

The operation of Fig. 10 is as follows: When contacts 18 are closed and relay 20 is energized sets of contacts 28 and 29 are closed thereby connecting the windings 2 and 3 of the motor to two of the conductors of a three-phase circuit 30 and the circuit for the motor is completed through the remaining winding 27 to the remaining conductor of circuit 30. The motor will then operate in the forward direction. If now contacts 18 are separated the relay 20 drops out thereby closing a set of contacts 31 whereby a substantial short circuit is produced across the windings 2 and 3 through the relay winding 11. This causes the relay operated by the winding 11 to pick up whereby single-phase power is applied to the motor through contacts 32 of the relay and the midpoint of reactor 26. The current divides equally and flows through the windings 2 and 3 and back to the circuit 30 through the winding 27. Auxiliary contacts 33 are provided for preventing current from flowing through the reactor 26 during the forward or reverse operation of the motor. The braking action is similar to the braking action in Figs. 1, 2, 3, 5 and 9 because the winding 27 is vertical and merely adds to the vertical component of the windings 2 and 3 and the horizontal components are in effect short-circuited with respect to the circulating current, as has already been explained. For reverse operation the relay 21 is energized through the contacts 19, thereby closing sets of contacts 34 and 35 which reverse the phase rotation of the motor thereby causing it to operate in the reverse direction. When contacts 19 are again opened the relay 21 drops out thereby closing a set of contacts 36 whereby the braking circuit is established.

In Fig. 11 is shown a complete control system embodying the braking modification shown in Fig. 6. The control contacts 18 and 19 and the relays 20 and 21 correspond to those in Fig. 9. In operation when the contacts 18 are closed the relay 20 closes its contacts 22 which establishes a circuit for forward rotation of the motor, as in Fig. 9. Relay 14 is also energized by the voltage across the capacitor 4 and closes its contacts at this time. When the contacts 18 are separated the relay 20 drops out and its contacts 23 close before relay 14 has time to open its contacts whereby line voltage is applied, through the contacts 23 and 24 in series with the contacts of the relay 14, to the midpoint of the reactor 13. Consequently, a single phase field is applied to the motor and the dynamic braking circuit is established and is maintained until the circulating current falls to such a low value, corresponding substantially to motor standstill, that the relay 14 drops out, thereby deenergizing the entire system. In a similar manner, when reverse rotation is desired the contacts 19 are closed whereby the relay 21 closes its contacts 25 which complete the circuit for energizing the motor for reverse operation. When the contacts 19 open the relay 21 drops out closing its contacts 24 which together with the contacts 23 and the contacts of relay 14 complete the energizing circuit for the dynamic braking circuit. This will continue until the motor is substantially at rest when the relay 14 drops out thereby entirely deenergizing the motor.

In Fig. 12 there is shown diagrammatically a complete system embodying the principle of Fig. 7. In this figure an auxiliary relay 37 is provided for making the plugging connections for the motor. The operation is as follows: When contacts 18 are closed relays 37 and 20 are energized in series. Current flows from the lower conductor of circuit 6 through contacts 22 of relay 20, a set of contacts 38 on relay 37, through the motor and back through a conductor 39 to the other side of the supply circuit 6. The motor then operates in the forward direction. If now contacts 18 are opened relay 37 is immediately deenergized but relay 20 remains energized through the following holding circuit: From the upper conductor of circuit 6 through a conductor 40, the left hand half of the secondary winding of reactance transformer 16, a conductor 41, closed contacts 23, the winding of relay 20 and back to the other side of the supply circuit 6. Consequently there is applied to the winding 20 a voltage which is the vector difference between the voltage of circuit 6 and of the voltage of the secondary winding of reactance transformer 16. Current then flows through the contacts 22 and through a set of contacts 42 on the relay 37 to the motor and back through the conductor 39. This establishes a reverse or plugging connection for rapidly braking the motor. As the motor speed falls the voltage applied to the winding 20 decreases until at standstill or at very low speed of the motor the voltage applied to the winding of relay 20 becomes insufficient to hold the relay energized and it drops out, thereby completely deenergizing the circuit. For reverse operation the motor will be energized through contacts 25 of relay 21 and a set of contacts 43 on relay 37. When it is desired to stop the motor the switch 19 will be opened thereby causing relay 37 to drop out but relay 21 will be maintained energized through a conductor 44 and contacts 24 which complete a circuit for applying to the winding of relay 21 a voltage which is the difference between the line voltage and the voltage across the right hand half of the secondary winding of the transformer 16. Consequently, the connections of the motor will be reversed through a set of contacts 45 on relay 37. This plugging connection will be maintained until the motor is substantially at rest when the relay 21 will drop out thereby restoring the circuit to a completely deenergized state as shown in the drawing. The reason only half the secondary winding of reactance transformer 16 is used each time is that the phase of the voltage across the capacitor reverses when the motor voltage is reversed. However the voltage of the two halves of this winding are opposite in phase so that the proper phase relation of the reactive component of the capacitor voltage is always inserted in each holding circuit.

Fig. 13 illustrates a modification of Fig. 11 in that a plugging connection is established momentarily after the application of the dynamic braking. This is accomplished by the addition of auxiliary relays 46 and 47. The operation is as follows: If contacts 18 are closed long enough to bring the motor up to speed the following sequence of operation will take place. When contacts 18 close relays 46 and 20 are energized in series and line voltage will be applied, through a set of contacts 48 on relay 20 in series with a set of contacts 49 on relay 47, to one side of the motor, the return circuit being through a conductor 50. The motor then comes up to speed in the forward direction. When the contacts 18 are again opened relay 20 drops out opening the motor circuit at contacts 48. At the same time a circuit is completed through a set of contacts 51 on relay 20 and a set of contacts 52 on relay 46 in series to the midpoint of reactor 13, thereby establishing the dynamic braking connection for the motor. The relay 46 is maintained energized through a set of contacts 53 thereon which connect the operating winding of the relay across a winding 54 which is inductively related to the reactor 13 and which consequently has a current induced therein proportional to the circulating current which exists during the dynamic braking. Also at the same time a circuit is completed through a set of contacts 55 on relay 20 and a set of contacts 56 on relay 46 in series for energizing the operating winding of relay 21. As soon as the dynamic braking action has substantially ceased the relay 46 drops out whereby a plugging circuit is momentarily completed through contacts 57 of relay 21 and a set of contacts 58 on relay 46 which tends to reverse the motor. This plugging circuit is only maintained momentarily because as the relay 46 has dropped out its contacts 56 have opened so that the relay 21 is deenergized. However, by properly proportioning the time of dropout of the relays the dynamic braking and the plugging may be relatively proportioned so as to produce a desired quick and complete stopping of the motor. For reverse operation the contacts 19 are closed whereby the motor is energized by the contacts 57 of relay 21 the contacts 58 of relay 46 in series. When the contacts 19 are again separated contacts 59 on relay 21 and contacts 60 on relay 47 complete the dynamic braking circuit to the midpoint of the reactor 13 and the relay 47 is maintained energized through its contacts 61 connecting its winding across the winding 54. Contacts 62 on relay 21 and contacts 63 on relay 47 energize the relay 20 so that when the dynamic braking action ceases and the relay 47 drops out the connections to the motor are reversed through the contacts 48 of relay 20 and 49 of relay 47 for the short interval of time required for the relay 20 to drop out.

In Fig. 14 the braking of a capacitor motor is secured by maintaining a plugging connection for a predetermined time by means of predetermined time delay drop-out relays 64 and 65. In operation, when the contacts 18 are closed relays 20 and 64 pick up and the circuit for the motor is completed through contacts 22 on relay 20. When contacts 18 are again opened relay 20 drops out immediately thereby closing a set of contacts 66 in series with a set of contacts 67 on time delay relay 64. This completes a plugging connection to the motor which is maintained for a predetermined time determined by the setting of relay 64. Similarly, for reverse operation when contacts 19 are closed relays 21 and 25 pick up at once thereby causing contacts 24 to open and 21 to close and energize the motor. When contacts 19 separate a plugging connection is established through contacts 68 on relay 21 and contacts 69 on relay 65 in series and this reverse connection is maintained for a predetermined time determined by the time setting of relay 65.

In Fig. 15 the plugging connections for braking are controlled by a drag switch 70 operated by friction from the motor shaft. The operation is as follows: When contacts 18 are closed and the relay 20 closes its contacts 22 the motor comes up to speed in the forward direction of rotation as indicated by the arrow. A circuit is simultaneously completed through a set of contacts 71 on relay 20 and the closed contacts of the drag switch 70 for an auxiliary relay 72. Relay 72 then closes its contacts 73 so that when contacts 18 are again opened and relay 20 closes a set of contacts 74 in series with contacts 73, a plugging connection for the motor is completed. This plugging is maintained until the motor starts to turn in the reverse direction when the drag switch 70 opens its contacts thereby deenergizing the auxiliary relay 72 which then drops out breaking the circuit for the plugging connection at the contacts 73. In a like manner for reverse rotation when the contacts 19 are closed and the relay 21 picks up the motor is energized through contacts 24. Simultaneously a set of contacts 75

75 on relay 21 close thereby energizing an auxiliary relay 76 through drag switch 70 which will then move to its other position due to reverse rotation. This relay closes a set of contacts 77 which complete a plugging connection to the motor through a set of contacts 78 on relay 21 when it drops out as a result of the opening of the contacts 19.

While I have shown and described particular embodiments of my invention, it will be obvious to those skilled in the art that changes and modifications may be made without departing from my invention, and I therefore aim in the appended claims to cover all such changes and modifications as fall within the true spirit and scope of my invention.

What I claim as new and desire to secure by Letters Patent of the United States is:

1. In a system of motor control, an alternating current circuit, an alternating current motor having two angularly displaced stator windings for producing a rotating magnetic field, and means for initiating dynamic braking of said motor while it is rotating and independently of the rotor position comprising apparatus for energizing said windings from said circuit with two inphase alternating currents and providing a relatively low impedance path exclusive of said alternating current circuit for current to circulate between said windings.

2. In a system of motor control, an alternating current circuit, an alternating current motor having two angularly displaced stator windings for producing a rotating magnetic field, and means for initiating dynamic braking of said motor while it is rotating and independently of the rotor position comprising apparatus for energizing said windings from said circuit with two inphase alternating currents which produce substantially equal ampere-turns in each winding and providing a relatively low impedance path exclusive of said alternating current circuit for current to circulate between said windings.

3. In a system of motor control, an alternating current circuit, an alternating current motor having two angularly displaced stator windings, and means including a reactive winding for establishing dynamic braking connections for said motor which comprises a connection from one side of said circuit to the electrical midpoint of said reactive winding, a connection from the other side of said circuit to one terminal each of said stator windings, and connections between the reactive winding terminals and the remaining two stator winding terminals respectively.

4. In combination, an alternating current supply circuit, a capacitor motor, means including two sets of main control contacts which when they are non-contemporaneously closed control respectively connections for operating the motor from the supply circuit in forward and reverse directions, and relay means responsive to the opening of either one of said sets of contacts when the other set is already open for automatically establishing electric braking connections between said supply circuit and said motor.

5. In combination, an alternating current supply circuit, a capacitor motor, means including separate sets of main control contacts which control selectively when they are non-contemporaneously closed connections for energizing said motor from said circuit for forward and reverse operation, and means responsive to the opening of either one of said sets of contacts while the other set is open for automatically establishing electric braking connections between said motor and said circuit and for maintaining said braking connections until said motor is at standstill or substantially at standstill.

6. In combination, a capacitor motor, an alternating current supply circuit, means including two sets of control contacts for controlling respectively connections for energizing said motor for forward or reverse operation from said alternating current circuit when said contacts are closed, means responsive to the opening of either set of control contacts when the other set is already open for making an electric braking connection between said motor and said circuit, and means responsive to an electrical condition of the capacitor of said motor for maintaining said electric braking connection until said motor is at standstill or substantially at standstill.

7. In a system of motor control, a capacitor motor provided with a phase-splitting capacitor, an alternating current supply circuit, means for establishing an electric braking connection between said motor and said circuit which renders ineffective the phase-splitting effect of said capacitor, and automatic means for maintaining said electric braking connection until the motor is substantially at rest and for thereafter causing disconnection of said motor from said supply circuit.

8. In combination, a self-starting single-phase induction motor of the type which is provided with a phase splitting capacitor, said motor having a running circuit including a set of running terminals and a braking circuit including a set of electric braking terminals, an alternating current supply circuit, control means including connection for first connecting said supply circuit to said running terminals so as to complete said running circuit and including additional connections for subsequently connecting said supply circuit to said braking terminals so as to complete said braking circuit, means for producing a voltage across said capacitor which is a function of the speed of said motor when said supply circuit is connected to said braking terminals comprising connections between said capacitor and said braking circuit, and means controlled by said capacitor voltage for disconnecting said supply circuit from said braking terminals when said motor is substantially at rest.

9. In a system of motor control, an induction motor having stator windings and a rotor, an alternating current supply circuit, means to produce a rotating magnetic field for operating said motor comprising first connections for energizing said stator windings from said supply circuit, and means to produce a stationary periodically reversing field for dynamically braking said motor comprising second connections for energizing said windings from said circuit, and means responsive to a function of the current in said windings while said motor is being dynamically braked for maintaining said dynamic braking connection until said motor is substantially at rest and for subsequently causing disconnection of said motor from said supply circuit.

10. In a system of motor control, a capacitor motor provided with a phase-splitting capacitor, an alternating current supply circuit, means for establishing an electric braking connection between said motor and said circuit which renders ineffective a phase-splitting effect of said capacitor, and means responsive to an electrical quantity associated with said motor which is a function of the speed of said motor while it is being 11. In a system of motor control, an alternating current supply circuit, a capacitor motor having windings which produce a rotating magnetic field, and circuit controlling means for connecting said motor to said circuit for running and for dynamic braking independently of the rotor position of said motor, said dynamic braking connection including means for effectively short circuiting the capacitor of said motor while both its terminals are connected to the motor windings for a period of time during which the rotor of said motor turns thru a substantial angle.

12. In a system of motor control, an alternating current supply circuit, a capacitor motor having windings which produce a rotating magnetic field, and circuit controlling means for connecting said motor to said circuit for running and for dynamic braking with alternating current independently of the rotor position of said motor, said dynamic braking connection including means for effectively short circuiting the capacitor of said motor while both its terminals are connected to the motor windings for a period of time during which the rotor of said motor turns thru a substantial angle.

13. In a system of motor control, an alternating current supply circuit, a capacitor motor having a relatively high resistance rotor, and circuit controlling means for connecting said motor to said circuit for running and for dynamic braking with alternating current independently of the rotor position of said motor, said dynamic braking connection modifying the circuit relationship between the capacitor of said motor and the rest of the motor while maintaining connections between both terminals of said capacitor and said motor.

14. In a system of motor control, an alternating current circuit, a capacitor motor having windings which produce a rotating magnetic field, and means for dynamically braking said motor independently of the position of its rotor by energizing the windings of said motor from said circuit with two inphase alternating currents and providing a relatively low impedance path exclusive of said alternating circuit for current to circulate between said windings.

15. In a system of motor control, an alternating current circuit, a capacitor motor having two angularly displaced stator windings for producing a rotating magnetic field, and means for dynamically braking said motor independently of the position of its rotor by energizing said windings from said circuit with two inphase alternating currents which produce substantially equal ampere-turns in each winding and providing a relatively low impedance path exclusive of said alternating current circuit for currents which circulate between said windings.

16. In a system of motor control, an alternating current circuit, a capacitor motor having two angularly displaced stator windings for producing a rotating magnetic field, and means independent of the rotor position of said motor for connecting said windings effectively in parallel across said circuit for dynamically braking said motor.

17. In a system of motor control, an altenating current supply circuit, an induction motor having two substantially equal quadrature related windings, and means independent of the rotor position of said motor for connecting said windings to said circuit effectively in parallel so as to produce a dynamic braking action.

18. In a system of motor control, a capacitor motor having a pair of stator windings and a phase splitting capacitor serially connected in a closed loop, an alternating current supply circuit, means to produce a stationary periodically reversing field for dynamically braking said motor comprising connections for energizing both of said windings across said supply circuit, said loop circuit having a circulating current induced therein during said dynamic braking, and electroresponsive means responsive to the circulating current in the capacitor for controlling the maintenance of the braking connection.

19. In a motor control system, a motor having two stator windings and a phase splitting capacitor serially connected in a closed loop circuit, a reactor, an alternating current supply circuit, and dynamic braking connections for said motor comprising a parallel connection of said reactor and capacitor, a connection from one side of said supply circuit to the electrical midpoint of said reactor, and a connection from the other side of said supply circuit to the junction of said windings.

20. In a dynamic braking circuit, in combination, an alternating current supply circuit, a capacitor motor having a pair of equal phase displaced stator windings and a phase splitting capacitor serially connected in a loop circuit, a reactor connected in parallel with the capacitor of said motor, a connection between one side of said supply circuit and the electrical midpoint of said reactor, a connection between the other side of said circuit and the junction of said windings, the capacitor of said motor being so proportioned as substantially to neutralize the inductance of the motor windings with respect to a current circulating in said closed loop.

21. In a system for dynamically braking a capacitor motor, in combination, a motor having a pair of equal phase displaced stator windings and a phase splitting capacitor serially connected in a closed loop, a reactor connected in parallel with said capacitor, an alternating current supply circuit, a connection between one side of said supply circuit and the electrical midpoint of said reactor, and a connection between the other side of said supply circuit and the junction point of said windings, the impedance of said reactor being substantially higher than the impedance of said capacitor.

22. In a system of dynamically braking a capacitor motor, in combination, a motor having a pair of phase displaced stator windings and a phase splitting capacitor serially connected in a closed loop, a reactor connected in parallel with the capacitor of said motor, an alternating current supply circuit, means for connecting one side of said supply circuit to the electrical midpoint of said reactor, and means for connecting the other side of said supply circuit to the junction of said windings, said reactor having a sufficiently high inductance to insure a substantially equal division of current between its two halves.

23. In a system of dynamically braking a capacitor motor, in combination, a motor having a pair of phase displaced stator windings and a phase splitting capacitor serially connected in a closed loop, a relatively high reactance reactor and a relatively high reactance relay winding connected in parallel with each other and in parallel with said capacitor, contacts controlled by said relay winding, an alternating current supply circuit, connections between one side of said supply circuit and the electrical midpoint of said reactor, and connections between the other side of said supply circuit and the junction of said windings, said contacts being serially connected in one of the two last mentioned connections.

24. In combination, an electric motor, an alternating current supply circuit, circuit controlling means for establishing a running connection between said motor and said circuit, and means controlled by said circuit controlling means and responsive to the opening of said running connection for automatically making a dynamic braking conection between said motor and said circuit, maintaining said dynamic braking connection until said motor is substantially at rest, and then making a momentary plugging connection between said circuit and said motor.

25. In combination, an electric supply circuit, an electric motor, means including two sets of control contacts which when they are individually closed control respectively connections between said motor and said circuit for forward and reverse operation of said motor, means responsive to the contemporaneous opening of both of said sets of control contacts for making a dynamic braking connection between said motor and said circuit, means for maintaining said dynamic braking connection until said motor is substantially at rest, and means for then making a momentary plugging connection between said motor and said circuit.

26. In combination, an electric motor, an electric supply circuit, a set of control contacts, separate intermediate relays for controlling connections between said motor and said circuit for forward and reverse operation, an auxiliary relay for controlling dynamic braking connections between said motor and said circuit, said control contacts being connected to energize simultaneously the intermediate relay for controlling the forward operation and the auxiliary relay, contacts on the intermediate relay for preventing the application of dynamic braking when said intermediate relay is energized, connections completed by the deenergization of said intermediate relay for completing the dynamic braking connection and for maintaining the auxilary relay energized, and connections completed by the deenergization of said intermediate relay and said auxiliary relay for energizing the other intermediate relay for controlling reverse operation, contacts on said auxiliary relay for preventing completion of the connections for reverse operation whereby when said auxiliary relay drops out a momentary plugging connection is made between said motor and said circuit.

27. A system of motor control comprising, in combination, an alternating current supply circuit, a capacitor motor having a pair of windings for producing a rotating magnetic field, and means which is independent of the rotor position of said motor for dynamically braking said motor by short-circuiting the capacitor thereof while said motor is connected to said supply circuit.

28. A system of motor control comprising, in combination, an alternating current supply circuit, a capacitor motor having a pair of windings for producing a pair of rotating magnetic fields, means for electrically establishing reversing operating connections between said circuit and said motor, and means which is independent of the rotor position of said motor for dynamically braking said motor by short-circuiting the capacitor thereof while said motor is connected to said supply circuit.

29. A system of motor control comprising, in combination, an alternating current supply circuit, a capacitor motor having two equal quadrature related windings for producing a rotating magnetic field and a capacitor permanently connected across said windings in series, and means which is independent of the rotor position of said motor for dynamically braking said motor by short-circuiting the capacitor thereof while said motor is connected to said supply circuit.

30. In combination, an induction motor having a pair of windings one terminal of each of which is connected to a common junction point, a relay winding having its terminals connected respectively to the remaining terminals of said windings, contacts controlled by the energization of said relay winding, a supply circuit, a connection from one side of said supply circuit through said contacts to the electrical midpoint of said relay winding, and a connection from the other side of said supply circuit to the junction point of said windings.

31. In combination, a capacitor motor having a pair of equal phase displaced windings and a cpacitor serially connected in a closed loop, a low impedance relay winding connected in parallel with said capacitor, contacts controlled by said relay winding, a source of alternating current, a connection between one side of said source of alternating current through said contacts to the electrical midpoint of said relay winding, and a connection from the other side of said source to the junction of said windings.

32. In combination, an alternating current circuit, a capacitor motor, two sets of control contacts for respectively controlling intermediate relays, each of said relays having contacts which when closed by the energization of their respective relays complete circuits between said motor and said circuit for causing forward and reverse operation respectively, an auxiliary relay, each of said relays having contacts which are closed when said relays are deenergized, a connection from one side of the capacitor of said motor through said last mentioned contacts and the winding of the auxiliary relay in series, said auxiliary relay winding having a relatively low impedance, said auxiliary relay when energized closing a set of contacts, and connections between one side of said alternating current circuit and the electrical midpoint of the auxiliary relay winding through the contacts of said auxiliary relay.

33. In combination, an alternating current supply circuit, a capacitor motor having a phase-splitting capacitor, electrical connections between said circuit and said motor, and electroresponsive means responsive to the magnitude and phase angle of the voltage across the capacitor of said motor for controlling the electrical connections between said motor and said circuit.

34. In a motor control system, an alternating current supply circuit, a capacitor motor provided with a phase-splitting capacitor, means for making electrical braking connections for the motor with said circuit, said connections producing a voltage across said capacitor and electroresponsive means responsive to one of a plurality of components of the voltage across the capacitor of said motor for controlling the maintenance of said braking connection.

35. In a system of motor control, a capacitor motor provided with a phase-splitting capacitor, a resistor and a reactance connected in series across said capacitor, means for establishing electrical braking connections for the motor with said circuit, said connections producing a voltage across said capacitor and electro-responsive means responsive to the voltage across said reactance for controlling the maintenance of said braking connections.

36. In a system of motor control, a source of alternating current, a capacitor motor, means for making electrical braking connections between the motor and the supply circuit, means for producing a reactance component of voltage drop across said capacitor during electrical braking of said motor and electro-responsive means responsive to the difference between the voltage of the supply circuit and the reactance component of the voltage drop across the capacitor for controlling the maintenance of said braking connections.

37. In combination, an alternating current supply circuit, a capacitor motor, separate relays for controlling connections between said motor and said circuit for forward and reverse operation, an auxiliary relay for controlling plugging connections between said motor and said circuit, means for energizing said auxiliary relay with either one of the other two relays, a resistance and an inductance connected across the capacitor of said motor, a circuit for applying the vector difference between the voltage of said supply circuit and the voltage across the reactor for maintaining the relays for controlling the forward or reverse operation of the motor energized after the intermediate relay becomes deenergized.

HARRY R. WEST.